(No Model.)
G. GOFF.
STEAM COOKER.
No. 499,984. Patented June 20, 1893.
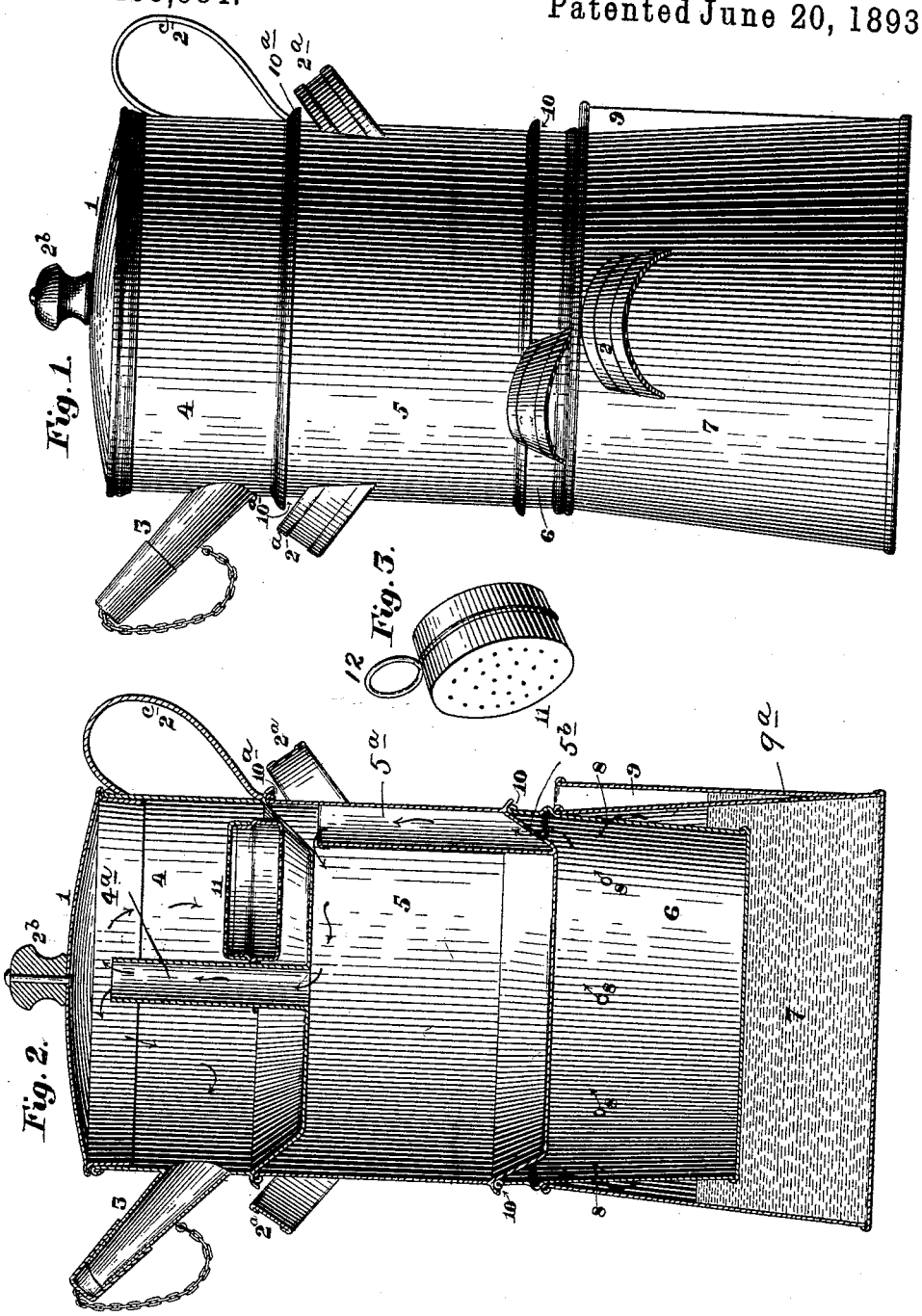
Witnesses:
A. O. Allen
W. C. Barth
Inventor:
Geo. Goff

UNITED STATES PATENT OFFICE.

GEORGE GOFF, OF IOLA, KANSAS.

STEAM-COOKER.

SPECIFICATION forming part of Letters Patent No. 499,984, dated June 20, 1893.

Application filed October 7, 1892. Serial No. 448,163. (No model.)

*To all whom it may concern:*

Be it known that I, GEORGE GOFF, a citizen of the United States, residing at Iola, in the county of Allen and State of Kansas, have invented new and useful Improvements in Steam-Cookers, of which the following is a full, clear, and exact description.

The invention relates to that class of steam cookers used for making tea, coffee, and other similar beverages, and its object is to provide an improved construction of the same which shall possess superior advantages with respect to efficiency in use.

The invention consists in the novel construction and combination of parts hereinafter fully described and claimed.

In the accompanying drawings, Figure 1 is an elevation of a steam cooker constructed in accordance with my invention. Fig. 2 is a central longitudinal section of the same. Fig. 3 is a perspective view of the coffee filter.

In the said drawings, the reference numeral 7 designates a water receptacle, preferably tapering in form as shown, and provided with a handle 2. A similar handle (not shown) is provided on the opposite side. This water receptacle or holder is provided with a filter spout 9, and is formed with perforations $9^a$ for the escape of the water from the spout into the holder. Seated upon the water holder is a vessel 6, provided with steam openings 8. Near the upper end this vessel is formed with an annular bead which rests upon the edge of the water holder or receptacle. The lower end of vessel 6 extends downwardly into the water receptacle or holder to about the middle thereof.

The numeral 5 designates a vessel, seated on vessel 6, and provided with an inwardly flaring bottom. At one side this vessel 5 is provided with a vertical steam pipe or tube $5^a$, open at its upper end and provided with holes $5^b$ at its lower end for the admission of steam from vessel 6. This vessel is provided with flanges 10, which seat upon the edge of vessel 6, and is also provided with handles $2^a$.

Seated upon vessel 5, is a coffee vessel 4, having an inwardly flaring bottom, a handle $2^c$, a cover 1, with a knob $2^b$, and a spout 3. Located centrally in this vessel 4, is a vertical steam tube $4^a$, open at each end and communicating with vessel 5.

The numeral 11 designates the coffee filter, consisting of a circular box, having a perforated bottom, and a removable perforated top. This filter is provided with a ring 12, which fits upon the tube $4^a$.

The vessel 4 is provided with a flange $10^a$, similar to flange 10, whereby it is seated on the vessel 5, below. The joints are all thus made steam tight.

The operation is as follows: The coffee filter is filled with coffee or other material, and the water receptacle or holder has a proper quantity of water introduced into it through the filter spout 9. The cooker is now placed on a stove or heater, and the steam generated thereby will escape through openings 8, into pipe $5^a$, from thence into vessel 5, to and through tube $4^a$, into vessel 4, where it will extract the strength from the coffee grounds or tea leaves in the filter.

Having thus described my invention, what I claim is—

In a steam cooker, the combination of the water holder 7, provided with the filter spout 9, the vessel 6 seated upon said water holder and provided with steam inlet openings 8, the vessel 5 provided at one side with a tube $5^a$ for the admission of steam and the coffee receptacle 4, provided at its center with a steam tube $4^a$ and a coffee filter 11, the vessels being provided with steam tight joints, substantially as described.

GEORGE GOFF.

Witnesses:
H. F. RUMBEL,
A. O. ALLEN.